United States Patent Office 3,415,002
Patented Dec. 10, 1968

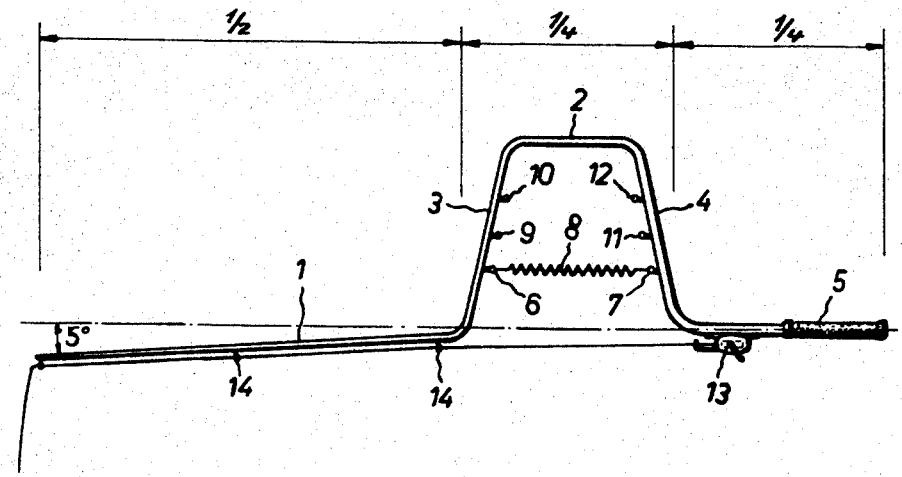

3,315,002
FISHING ROD
Charles Schaefer, Granada Hills, Calif., assignor to
Hans U. Sieber, Zurich, Switzerland
Filed Jan. 24, 1967, Ser. No. 611,423
Claims priority, application Switzerland, Feb. 1, 1966,
1,334/66, Patent 432,927
16 Claims. (Cl. 43—18)

ABSTRACT OF THE DISCLOSURE

A fishing rod having a handle and a shaft portion formed from one piece of flexible material. The shaft portion is formed with an upwardly-extending offset portion comprising two sections bent laterally from the rod axis and connected together by a section extending parallel to the rod axis. The offset portion is integral with a forward shaft portion which is inclined downwardly at a slight angle relative to the rod axis. An elastic member is adjustably secured in a plurality of positions between the laterally bent sections to provide an adjustable springiness to the rod, and a reel is mounted on the rod below the rod handle.

---

This invention relates to a general-purpose fishing rod for fresh and salt water fishing, having an upwardly-extending offset bend in its shaft and a positionably adjustable tension spring in the bend, for providing a shaft with an adjustable springiness. The axis of the reel is located below that of the rod handle, and the front rod section joins the bend at a point below the latter axis extended.

Up to the present time it has been necessary to use a particular rod for each kind of fishing. This is disadvantageous not only because the fisherman was obliged to take along several different kinds of rods, but also because the possibility of using a particular rod was limited, since the fisherman did not always know beforehand what kind of fishing he would encounter in a given fishing spot. Furthermore, it was necessary to have a variety of rods of conventional construction of different flexibility or stiffness, in order that the fisherman might have at hand a rod suitable for the size of the fish to be caught.

The invention provides a rod of very short construction that has a shaft of flexible material. Moreover, the flexibility of the shaft can be varied to suit the kind and type of fishing, by shifting the position of an elastic member connected between the side of the offset bend in the shaft.

The front section of the rod shaft is advantageously downwardly inclined with respect to the rod handle axis.

The axis of the reel may be located below that of the rod handle, and the front rod section where it joins the shaft bend also may be located below the rod handle axis, whereby to ensure a smooth and trouble-free movement of the fishing line through the guides.

An object of the invention is a fishing rod which, because of its mechanical properties and the manner of its construction, not only avoids the above-mentioned drawbacks of conventional rods but also ensures a quicker, farther, and more accurate cast, as well as a particularly sensitive reeling in of the line.

This and further objects of the invention will be apparent from the following detailed description.

The figure of the drawing shows a preferred embodiment of the invention in side view.

With reference to the figure, the one-piece fishing rod comprises the sections referenced 1 to 5, of which the section 1 is the front portion of the shaft, 2 is an intermediate portion extending parallel to the rod shaft axis, 3 and 4 form each a respective side of the shaft bend, and 5 is the handle. An elastic member 8, such as a tension spring, is stretched between the sides 3 and 4 by connecting to respective fasteners 6 and 7, which may be hooks or of any other desired, known construction. Additional fasteners, such as those numbered 9–12, may be provided in any desired number and spacing along respective sides 3 and 4, whereby the tension spring can be shifted parallel to itself to different positions in the bend. In a variant of the embodiment, only a single pair of fasteners is used, such as 6 and 7, which are arranged, in any known and desirable manner, to be movable and fixable along the length of the sides 3 and 4, thereby enabling an adjustment of the spring's position.

The reel 13 is mounted perpendicular to the rod axis (as defined by the handle 5) and its axis is spaced several centimeters therefrom, in order to ensure that the fishing line runs straight and free through the guides 14.

The one-piece fishing rod is made of spring steel, fiberglass, or a similar flexible material. The flexibility of the rod is obtained through the material used and the shape of the rod.

In a particularly advantageous embodiment, as illustrated in the figure, the bend is approximately one-fourth, and the front section one-half, of the entire rod length. The width of the bend, as measured along the rod axis, is advantageously approximately equal to the height of the bend. The sections 3 and 4 make an angle of from 10° to 20° with respect to the perpendicular to the rod axis, whereby the section 2 is shorter than the bend width.

In the perferred embodiment of the invention, the front rod section 1 forms with the rod axis extended an angle of approximately 5°. The rear end of the section 1, at the connection to the side 3, is located approximately 5 cms. below the rod axis. The side 3 is thus longer than the side 4 by a corresponding amount. As a result, the spacing of the reel axis below the rod axis is compensated for, and a straight, trouble-free running of the fishing line is ensured.

The one-piece fishing rod of the invention ensures a comfortable manipulation, and has an extremely short total length which permits it being put in the trunk of a European automobile.

The elasticity of the rod shaft together with the elastic member ensures that the rod's sensitivity can be adjusted to suit the requirements of each kind of fishing.

I claim:

1. A general-purpose fishing rod for fresh and salt water fishing, comprising a shaft of flexible material, said shaft including a handle portion defining the rod axis and an upwardly-extending bent portion, said bent portion having two spaced side sections bent out of the shaft and connected together by a section that extends parallel to said rod axis, and an elastic means connected between said side sections.

2. The fishing rod as defined in claim 1, wherein said shaft includes a front section, said bent portion joining said front section to said handle portion, and wherein the spacing between said side sections, as measured along said rod axis, is approximately one-fourth, and the length of said front section is approximately one-half, of the entire rod length.

3. The fishing rod as defined in claim 2, wherein said front section is downwardly inclined with respect to said rod axis, when said rod is in position for fishing.

4. The fishing rod as defined in claim 3, wherein said front section makes an angle of approximately 5° with respect to said rod axis.

5. The fishing rod as defined in claim 2, wherein said front section where it joins said bent portion is spaced below said rod axis, when said rod is in position for fishing.

6. The fishing rod as defined in claim 5, wherein said front section where it joins said bent portion is spaced approximately 5 centimeters below said rod axis.

7. The fishing rod as defined in claim 1, wherein said connecting section is shorter than the spacing between said side sections, as measured along said rod axis, and each said side section inclines between 10 and 20° from the perpendicular to said rod axis.

8. The fishing rod as defined in claim 7, wherein said elastic means is a tension spring which can be stretched between said side sections along different corresponding points thereof.

9. The fishing rod as defined in claim 1, wherein said elastic means is a tension spring stretched between said side sections.

10. The fishing rod as defined in claim 9, including a plurality of pairs of fastening means spaced along the lengths of said two side sections, for holding said tension spring in different positions.

11. The fishing rod as defined in claim 9, including an individual fastening means movable and fixable in a plurality of positions along the lengths of the respective said side sections.

12. The fishing rod as defined in claim 1, including a reel mounted on said rod, said reel defining an axis and the axis thereof being located below said rod axis when said rod is in position for fishing.

13. The fishing rod as defined in claim 12, wherein said front section where it joins said bent portion is spaced below said rod axis, when said rod is in position for fishing, such as to ensure a smooth, trouble-free running of the fish line.

14. The fishing rod as defined in claim 1, wherein said shaft is spring steel.

15. The fishing rod as defined in claim 1, wherein said shaft is fiberglass.

16. The fishing rod as defined in claim 1, wherein said shaft is of one-piece construction.

References Cited

UNITED STATES PATENTS

| 2,230,229 | 2/1941 | Benson | 43—18 |
| 2,334,646 | 11/1943 | Price | 43—18 |
| 2,538,306 | 1/1951 | Fox et al. | 43—18 |
| 2,610,427 | 9/1952 | Caroland | 43—18 |

SAMUEL KOREN, *Primary Examiner.*

D. J. LEACH, *Assistant Examiner.*